United States Patent [19]
Hamelink

[11] Patent Number: 6,161,468
[45] Date of Patent: Dec. 19, 2000

[54] FOUR-PIECE OIL SEAL

[75] Inventor: Joseph C. Hamelink, Muskegon, Mich.

[73] Assignee: Dana Corporation, Toledo, Ohio

[21] Appl. No.: 09/221,740

[22] Filed: Dec. 28, 1998

[51] Int. Cl.$^7$ ........................................................ F16J 9/00
[52] U.S. Cl. ................................................ 92/253; 277/479
[58] Field of Search ................................ 92/253; 277/479

[56] References Cited

U.S. PATENT DOCUMENTS

| | | |
|---|---|---|
| 1,720,504 | 7/1929 | Williams et al. . |
| 2,254,753 | 9/1941 | Phillips . |
| 2,310,311 | 2/1943 | Phillips . |
| 2,329,950 | 9/1943 | Smith ...................................... 277/479 |
| 2,349,903 | 5/1944 | Fall . |
| 2,877,072 | 3/1959 | Pien ........................................ 277/479 |
| 3,400,941 | 9/1968 | Hutto . |
| 5,564,699 | 10/1996 | Lawrence et al. . |
| 5,598,763 | 2/1997 | Rao et al. . |
| 5,603,512 | 2/1997 | Lawrence et al. . |
| 5,618,046 | 4/1997 | Binford . |
| 5,743,171 | 4/1998 | Ariga . |
| 5,743,535 | 4/1998 | Hodgins . |

*Primary Examiner*—F. Daniel Lopez
*Attorney, Agent, or Firm*—Rader, Fishman & Grauer PLLC

[57] ABSTRACT

A four-piece oil seal is disclosed that includes a resilient expander spacer having an axial top edge, an axial bottom edge and an axial intermediate portion therebetween. The axial intermediate portion of the resilient expander spacer includes a plurality of intermittent radially outwardly extending tab pairs that define circumferential slots. A first rail contacts the axial top edge of the expander spacer. A second rail is disposed within the slots formed in the radially extending tabs. A third rail contacts the axial bottom edge of the expander spacer. Preferably, the radially extending tabs are in the form of intermittent U-shaped ridges and include spacer lugs located at a bridge portion therebetween. The ridges form center openings in the expander spacer while the spacer lugs maintain separation between adjacent rails.

10 Claims, 2 Drawing Sheets

FOUR-PIECE OIL SEAL

FIELD OF INVENTION

The present invention relates to a piston ring, and more particularly to a four-piece oil seal for use on a piston within an internal combustion engine or in a compressor.

BACKGROUND OF THE INVENTION

Piston rings are well known. They are usually received within an annular groove disposed about an outer periphery of a piston. In turn, the piston is reciprocated within a cylinder of an internal combustion engine or a compressor. The piston compresses fluids such as gases within a chamber of the cylinder. In the case of an internal combustion engine, these fluids are ignited and expand within a combustion chamber, forcing the piston away from the point of ignition. In the case of a compressor, these fluids are compressed within a compression chamber.

The primary function of piston rings is to provide an effective seal of the gases, called "blow-by control", and is accomplished by placing a first piston ring, called a compression seal, near the uppermost portion of the piston. The compression seal is designed to seal during an up-stroke of the piston to compress the gases within the chamber. A secondary function of piston rings is to prevent excess lubricating oil from entering the chamber. To accomplish the secondary function, a second piston ring, called an oil seal, is placed below the compression seal to prevent oil from being carried up into the chamber. Thus, the compression seal and the oil seal both cooperate to effectively seal the chamber from escaping gases or entering lubricating oil.

Typically, a piston ring comprising the oil seal is discontinuous, having two end portions. The end portions are separated from one another, forming a gap, to expand the piston ring for insertion into a corresponding groove of the piston. The piston ring is then compressed, bringing the end portions closer together, to install the piston within the cylinder. Once installed, a gap still exists between the two end portions of the piston ring. As a result, single piece oil seals are ineffective because oil may pass through the gap between the two end portions.

Oil seals therefore typically include multiple pieces, and the design of oil seals plays an important role in sealing. One known oil seal includes three pieces for oil control, including first and second piston rings, or rails, separated by a spacer. The first and second rails cooperate to scrape oil from an inner surface of the cylinder while the spacer maintains a distance between the first and second rails to prevent overlap or interference between the rails. In another known arrangement, an expander ring is used to bias first and second rails outwardly towards a cylinder wall. It is also known to provide first and second rails separated by a resilient spacer that includes a circumferential slot for receiving a third rail. In such an arrangement, the center rail is usually allowed to float within a space provided between the two outer rails, or else the center rail is secured in place and the two outer rails are allowed to freely move. Any of the known three rail arrangements raises the possibility of excess movement by a rail such that it interferes with proper operation of the remaining rails. Further, because each rail includes gapped ends, oil may leak past the oil seal through the combined gapped ends and make its way into the upper portion of the cylinder.

SUMMARY OF THE INVENTION

The present invention is directed to a four-piece oil seal assembly for use on a piston of an internal combustion engine or a compressor. The oil seal assembly includes a resilient expander spacer having an axial top edge, an axial bottom edge and an axial intermediate portion therebetween. The axial intermediate portion of the resilient expander spacer includes intermittent, circumferentially spaced, radially outwardly extending tab pairs. The tabs within the tab pairs are axially spaced and cooperate to define circumferential slots. A first rail contacts the axial top edge of the expander spacer. A second rail is disposed within the slots formed by the radially extending tab pairs. A third rail contacts the axial bottom edge of the expander spacer.

In a preferred embodiment, the radially extending tab pairs are in the form of U-shaped ridges, having radially outwardly extending legs connected by a bridge portion. The ridges are intermittent, in that the ridges are circumferentially spaced from each other. The U-shape of the ridges leaves center openings in the expander spacer radially inwardly of the bridge portions. Most preferably, the U-shaped ridges further include spacer lugs located at the bridge portion. The spacer lugs support the axial outer rails and prevent axial motion of the rails relative to the expander spacer.

Moreover, since each rail is a split rail, each rail includes a gap between two end portions of the rail. Correct assembly of the four-piece oil seal requires that the gaps in each rail be offset or staggered circumferentially about the piston, thereby creating a labyrinth through which oil must flow to reach the upper cylinder area. Creation of a complex flow path reduces oil consumption in either an internal combustion engine or a compressor.

The addition of a second rail between the first and third rails adds an additional scraping surface to increase the amount of oil scraped from the cylinder wall and to reduce oil leakage past the oil seal. The presence of the center openings between adjacent rails also provides an increased oil flow area to accommodate the increased flow of oil scraped from the cylinder wall. The expander spacer biases all three rails towards the cylinder wall, and the presence of the spacer lugs correctly positions the rails to prevent any overlap or interference between the individual rails. Correct positioning of the three rails in combination with the expander spacer provides a method to greatly reduce oil leakage into the chamber.

BRIEF DESCRIPTIONS OF THE DRAWINGS

The features and inventive aspects of the present invention will become more apparent upon reading the following detailed description, claims, and drawings, of which the following is a brief description;

DETAILED DESCRIPTION OF PREFERED EMBODIMENT

Figure 1:
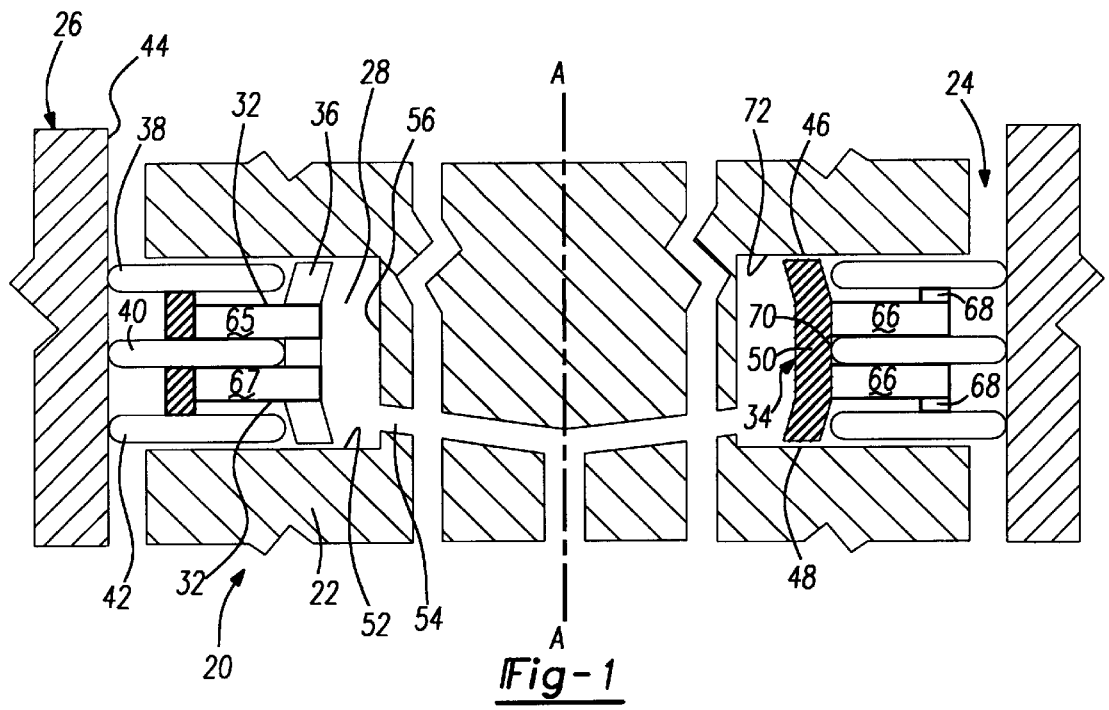
FIG. 1 is an environmental cross-sectional view of the four-piece oil seal inserted within a piston.

A portion of a piston assembly 20 is illustrated in FIG. 1 that includes a piston 22 reciprocable along a longitudinal axis A-A within a bore 24 of a cylinder 26 of internal combustion engine or a compressor. The piston 22 includes an annular groove 28 for receiving an annular piston ring or sealing member. In FIG. 1, the piston 22 includes a four piece oil seal assembly 34 of the present invention.

The four-piece oil seal assembly 34 is received in the annular groove 28, and includes an annular expander spacer 36, a top rail 38, an intermediate rail 40 and a bottom rail 42. The expander spacer 36 is annular and resilient, biasing the rails 38, 40 and 42 outwardly into frictional engagement with an inner surface 44 of the cylinder bore 24. The expander spacer 36 has an axial extent, defining an axial top edge 46 and an axial bottom edge 48 with an axial intermediate portion 50 therebetween. As seen in FIG. 1, the top rail 38 is located adjacent to the axial top edge 46 of the expander spacer 36 while the bottom rail 42 is located adjacent the axial bottom edge 48 of the expander spacer 36. Both the axial top edge 46 and the axial bottom edge 48 of the expander spacer 36 are angled radially inwardly with respect to the axial intermediate portion 50 to provide a side seal within the annular groove 28 to block the flow of oil around the oil seal assembly 34.

As the piston 22 reciprocates within the cylinder bore 24, the four-piece oil seal assembly 34 of the present invention removes oil from the cylinder inner surface 44 to minimize the amount of oil that migrates to an upper portion of cylinder 26. For example, on every down stroke of the piston 22, an oil film (not shown) on the cylinder inner surface 44 is first scraped by the bottom rail 42. Oil removed by the bottom rail 42 is prevented from entering the groove 28 by the formation of a seal between the axial bottom edge 48 of the expander spacer 36 in contact with a lower wall 52 of the annular groove 28. As the down stroke of the piston 22 continues, the intermediate rail 40 and the top rail 38 also scrape additional amounts of oil from the cylinder inner surface 44. Oil scraped by the intermediate rail 40 and the top rail 38 is channeled through center openings 32 in the expander spacer 36 and is forced through a plurality of drain vents 54 machined into a bottom wall 56 of the annular groove 28. It can be seen that by increasing the number of rails in contact with the inner surface 44 of cylinder bore 24, oil scraping efficiency is increased.

But increasing the number of rails in contact with the inner surface 44 also increases the chance of an overlap between rails whereby one rail interferes with the performance of another rail. The four-piece oil seal of the present invention avoids the problem of overlap by combining the function of separate expander and spacer rings into expander spacer 36. The expander spacer 36 is generally annular in shape to fit within the groove 28 on the piston 22. The expander spacer 36 is also split, forming a gap 60 between two split ends 62, 64 (see FIG. 3). Because the expander spacer 36 includes the gap 60 and is formed from a resilient material, the expander spacer 36 tends to bias radially outwardly toward the inner surface 44 of cylinder bore 24. The expander spacer 36 further includes tab pairs 66 that extend radially outwardly from the axial intermediate portion 50. In a preferred embodiment, the two tabs of the tab pairs 66 are axially spaced to form a circumferential slot 70 between the tabs to receive the intermediate rail 40. In this configuration, the top rail 38 is maintained in position between one tab 65 and an upper wall 72 of the groove 28 while the bottom rail 42 is held in position between a second tab 67 and the lower wall 52 of the groove 28. All three rails 38, 40 and 42 are in direct contact with the expander spacer 36.

Figure 2:
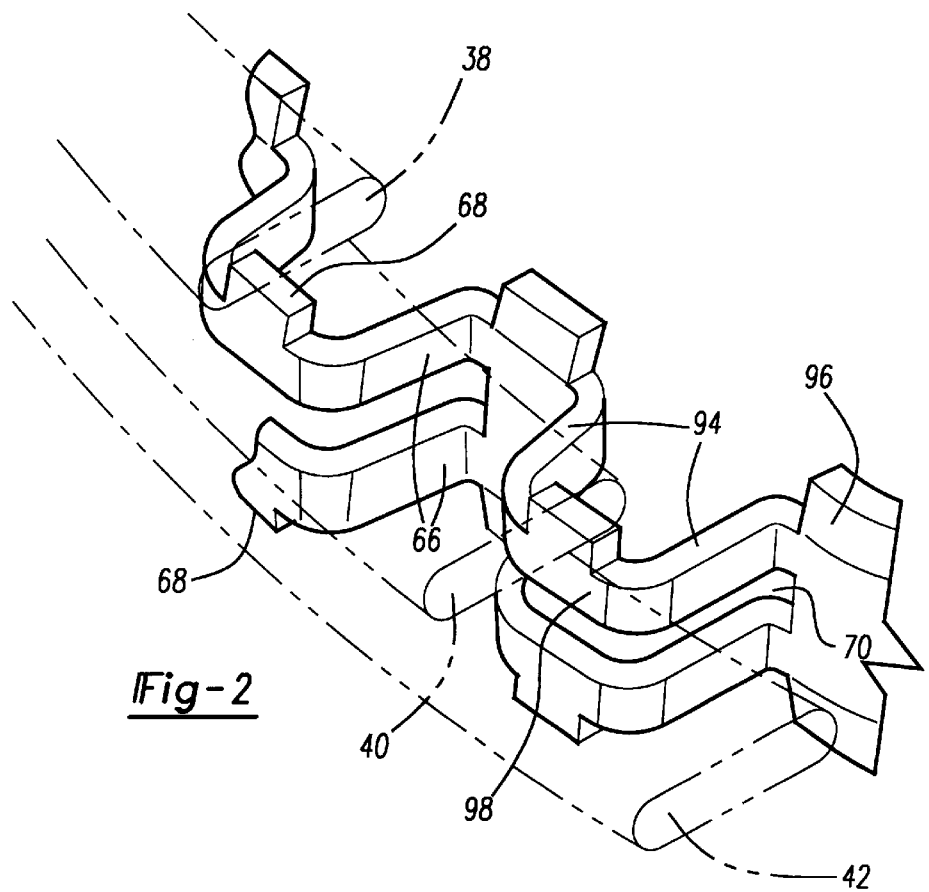
FIG. 2 is a cut-away view of the four-piece oil seal of the present invention.

The addition of the intermediate rail 40 alone is insufficient, however, because conventional expander rings do not provide sufficient surface area for scraped oil to flow back into the crankcase. Conventional expander rings also allow overlap between adjacent rails. Not only do tab pairs 66 cooperate to separate the three rails 38, 40 and 42, but the tab pairs 66 are also configured to provide sufficient surface area for oil flow, as shown in FIG. 2. The tab pairs 66 are preferably circumferentially spaced such that they are intermittent about the circumference of the expander spacer 36. The tab pairs 66 may be formed into various geometric shapes through a combination of gearing and stamping during manufacture, such as triangular or semi-circular, without departing from the scope of the present invention. But most preferably, the tab pairs 66 are formed into generally U-shaped ridges, each having two leg portions 94 extending radially away from the axial intermediate portion 50 defining a base portion 96 of the expander spacer 36. The U-shaped ridges also include a bridge portion 98 interconnecting the leg portions 94 at a radial outer extent of expander spacer 36. As noted above, the tab pairs 66 cooperate to define the circumferential slot 70 between the tabs. The intermediate rail 40, shown in phantom in FIG. 2, is received within the circumferential slot 70, where it is maintained in its proper orientation by adjacent bridge portions 98. The bridge portions 98 of the tab pairs 66 are further formed with spacer lugs 68 that interact with a radial edge of the axial outer rails 38 and 42 to both space the rails 38, 40 and 42 apart and to prevent unwanted interaction or overlap between the rails.

In addition, formation of the tab pairs 66, including leg portions 94 and bridge portion 98, also forms apertures 100 in the expander spacer 36. In particular, the apertures 100 are formed radially inwardly of the bridge portion 98 of the tab pairs 66. Oil scraped from cylinder wall 44 flows through the apertures 100 and is channeled into the vents 54 formed in the bottom of the groove 28.

Figure 3:
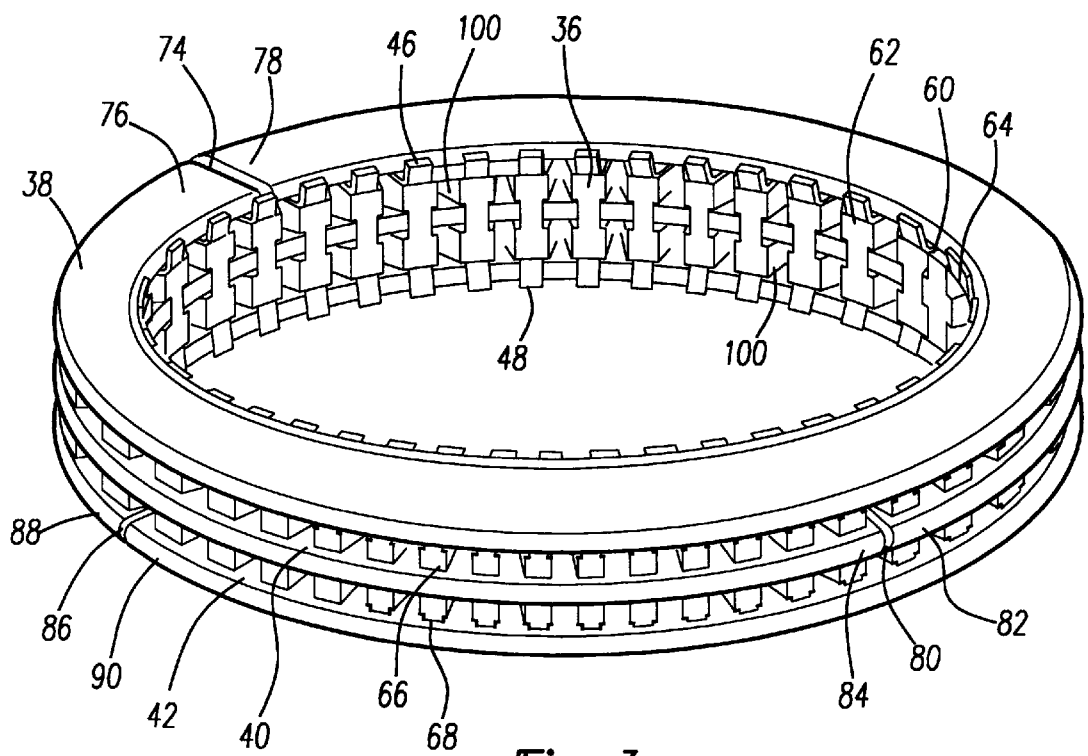
FIG. 3 is an environmental perspective view of a piston including the fourpiece oil seal of the present invention.

As noted above, expander spacer 36 is split, forming a gap 60 between two split ends 62, 64. In addition, and with reference to FIG. 3, each of the three rails 38, 40 and 42 is also formed from a split ring. The top rail 38 includes a top rail gap 74 formed between the top rail free ends 76 and 78. Likewise, the intermediate rail 40 includes an intermediate rail gap 80 formed between the intermediate rail free ends 82 and 84 while the bottom rail 42 includes a bottom rail gap 86 formed between the bottom rail free ends 88 and 90. When the piston 22 reciprocates within the cylinder 26 such that the four-piece oil seal assembly 34 of the present invention scrapes oil from the cylinder inner surface 44, oil is either directed back down into a crankcase (not shown) or is directed through the vents 54, again into the crankcase. The presence of the gaps 74, 80 and 86 provides a potential flow path for allowing oil to flow past the four-piece oil seal assembly 34. According to the present invention, the gaps 74, 80 and 86 are circumferentially offset from each other, as shown in FIG. 3, to form a complex and convoluted flow path between the bottom rail 42 and the upper rail 38. By offsetting the gaps 74, 80 and 86, more labyrinth is created, thereby preventing more oil from flowing past the top rail 38. The configuration of the expander spacer 36 also provides greater surface area for oil scraped from the cylinder inner surface 44 to accumulate and be directed through the apertures 100, through to the vents 54 and back into the crankcase. Further, the addition of the intermediate rail 40 also improves the scraping ability of the combined four-piece oil seal assembly 34 by at least a third, simply by adding another scraping surface.

Thus, the expander spacer 36 biases the rails 38, 40 and 42 radially outwardly of piston 22 by means of the axial intermediate portion 50 so that the rails 38, 40 and 42 contact the inner surface 44 of cylinder bore 24. The rails 38, 40 and 42 are not free to move axially because they are constrained by the bridge portion 98 and the intermittent circumferentially spaced tab pairs 66 on the expander spacer 36. Moreover, as discussed above, the upper rail 38 is axially constrained by the upper groove wall 72, while the lower rail 42 is axially constrained by the lower groove wall 52. The rails 38, 40 and 42 cooperate with the tab pairs 66 on expander spacer 36 to maintain clearance between the rails and to prevent undesirable interaction between them. The tab pairs 66 formed on the expander spacer 36 also provide greater flow area for oil scraped from the inner surface 44 of cylinder bore 24 to flow through vents 54 back into the crankcase of the engine. Moreover, each of the rails 38, 40 and 42 include respective gaps 74, 80 and 86 that are circumferentially offset from each other to form a more tortuous or labyrinthine flow path for oil to flow past the top rail 38 and reach an upper area of the cylinder 26. As a result, the four-piece oil seal of the present invention not only increases the scraping efficiency of the oil seal, but also increases the integrity of the oil seal, preventing undesirable flow of oil past the oil seal. The integrity of the four-piece oil seal assembly 34 of the present invention is also maintained because the axial intermediate portion 50 of the split expander spacer 36 biases the three rails 38, 40 and 42 into contact with the inner surface 44 of the cylinder 26 while preventing undesirable interaction between adjacent rails 38, 40 and 42.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A four-piece oil seal, comprising:
   a resilient expander spacer having an axial top edge, an axial bottom edge, and an axial intermediate portion therebetween, said axial intermediate portion including a plurality of radially extending tab pairs, the tabs of said tab pairs axially spaced to form circumferential slots, said axial top edge and said axial bottom edge angled radially inwardly with respect to said axial intermediate portion;
   a first rail contacting said axial top edge;
   a second rail disposed within said slots; and
   a third rail contacting said axial bottom edge.

2. A four-piece oil seal, comprising:
   a resilient expander spacer having an axial top edge, an axial bottom edge, and an axial intermediate portion therebetween, said axial top edge and said axial bottom edge angled radially inwardly with respect to said axial intermediate portion, said axial intermediate portion including a plurality of radially outwardly extending U-shaped tab pairs, each tab of said pairs formed by two radially extending legs interconnected by a bridge portion therebetween, said tabs of each pair axially spaced to form circumferential slots and circumferentially adjacent tab pairs separated by a base portion;
   a first rail contacting and being radially outwardly biased by said axial top edge;
   a second rail disposed within said slots slots and being radially outwardly biased by said axial intermediate portion; and
   a third rail contacting and being radially outwardly biased by said axial bottom edge.

3. A four-piece oil seal as in claim 2, wherein circumferentially adjacent tab pairs are separated by a base portion of said expander spacer, said base portion including generally axially upwardly and downwardly extending fingers, said fingers forming said axial top and bottom edges, respectively, said fingers further respectively contacting and radially outwardly biasing said first and third rails.

4. A four-piece oil seal as recited in claim 3, wherein each said bridge portion further includes a spacer lug located adjacent said slots for maintaining separation between said first, second and third rails.

5. A four-piece oil seal as recited in claim 4, wherein said tabs are intermittent and circumferentially spaced.

6. A four-piece oil seal as recited in claim 5, wherein said first, second and third rails are split thereby defining a gap between first and second ends of each respective rail.

7. A four-piece oil seal as recited in claim 6, wherein said gaps of said first, second and third rails are circumferentially offset from one another.

8. A four-piece oil seal as in recited claim 2, wherein each of said tabs further includes a spacer lug extending axially from said bridge portion adjacent said slot, said spacer lugs contacting one of said rails.

9. A four-piece oil seal as recited in claim 8, a first spacer lug defining said axial top edge and a second spacer lug defining said axial bottom edge.

10. A four-piece oil seal as in claim 4, wherein said second rail is secured within at least one of said slots.

* * * * *